United States Patent [19]

Dango

[11] 4,429,785
[45] Feb. 7, 1984

[54] CURVE-NEGOTIATING PLATE CONVEYOR

[76] Inventor: Manfred Dango, Harkortstrasse 15, 5900 Siegen 1, Fed. Rep. of Germany

[21] Appl. No.: 351,732

[22] Filed: Feb. 23, 1982

[30] Foreign Application Priority Data

Feb. 26, 1981 [DE] Fed. Rep. of Germany ....... 3107127

[51] Int. Cl.³ .............................................. B65G 17/26
[52] U.S. Cl. .................................... 198/852; 59/901; 305/58 PC; 474/210
[58] Field of Search ...................... 198/851, 852; 59/8, 59/35 CP, 78, 84, 35 R; 305/11, 36, 58 R, 58 PC; 474/156, 210, 228, 229; 16/229, 380, 221

[56] References Cited

U.S. PATENT DOCUMENTS

| 1,743,157 | 1/1930 | Morse | 474/229 |
| 2,743,003 | 4/1956 | Allen | 198/851 |
| 3,868,011 | 2/1975 | Janzen et al. | 59/35 R |

FOREIGN PATENT DOCUMENTS 2264865  5/1978  Fed. Rep. of Germany .

Primary Examiner—Sherman Basinger
Attorney, Agent, or Firm—Spencer & Frank

[57] ABSTRACT

A plate chain conveyor assembly including a plurality of plate members each having first and second opposite ends, a single hinge eye being provided at the first end of each plate member and two juxtaposed hinged eyes being provided at the second end of each plate member. Plate members are disposed adjacent one another such that the single hinge eye of each plate interengages with the two juxtaposed hinge eyes of an adjacent plate member to form a passage therethrough. A hinge bolt is disposed in each passage formed by the interengaged hinge eyes. Each hinge bolt has cylindrical ends connected to a center section. The center section has a cross section which changes from a substantially circularly shaped center portion to a substantially lens shaped cross section towards each of the cylindrical ends. The hinge bolts are disposed in each of the passages with the lens-shaped cross section having its larger cross sectional dimension oriented perpendicularly to the plane of the plate member having the two juxtaposed hinge eyes through which the bolt passes.

6 Claims, 7 Drawing Figures

FIG.1
FIG.2
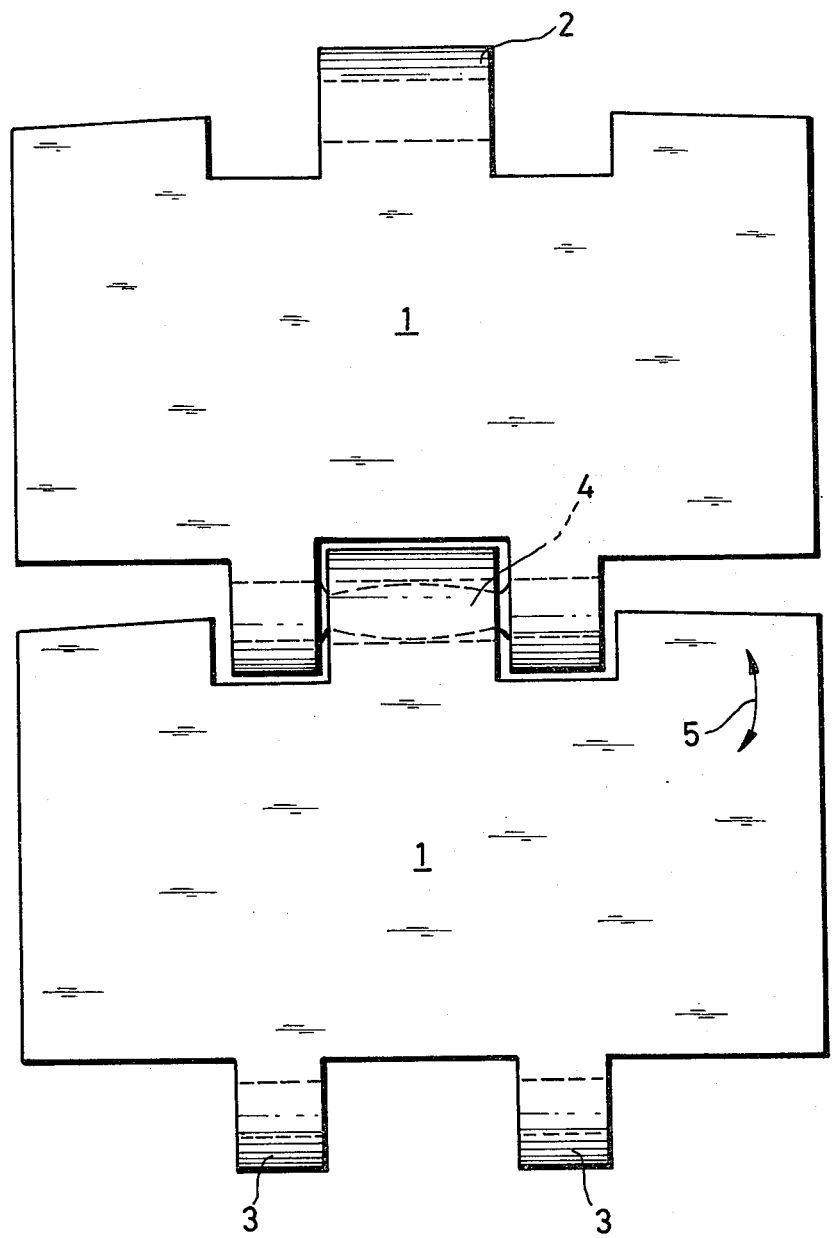
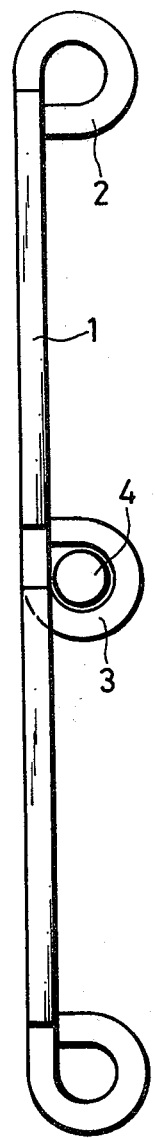

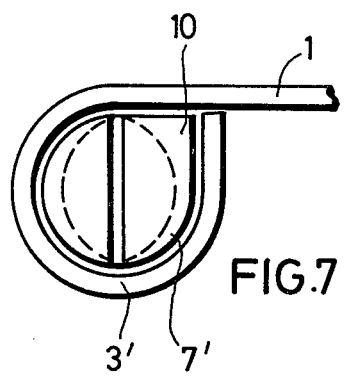
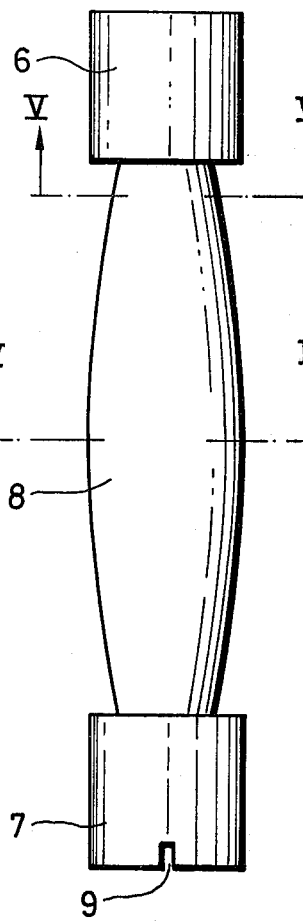
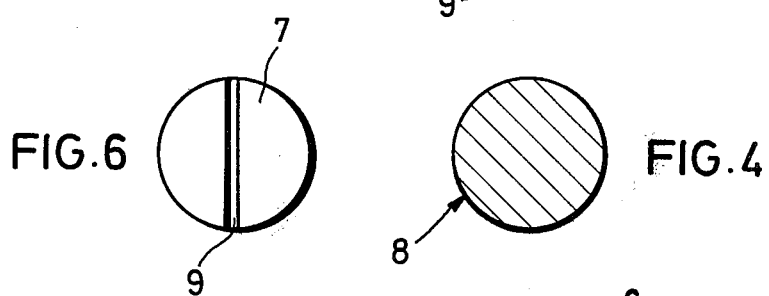
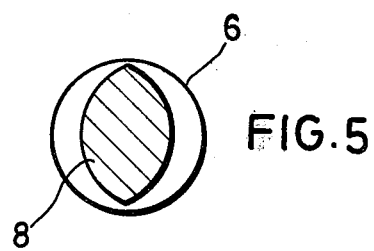

CURVE-NEGOTIATING PLATE CONVEYOR

BACKGROUND OF THE INVENTION

The invention relates to a curve-negotiating chain conveyor, particularly to a plate conveyor, whose individual chain link members are connected together in the manner of a hinge by means of interengaging hinge eyes via a hinge bolt, with the hinge bolt having cylindrical ends and an approximately barrel-shaped center section.

A chain conveyor of the above-mentioned type is known from DE-AS No. 2,264,865. However, the barrel-shaped center section of the hinge bolt in the prior art chain conveyor has a circular cross section over its entire length from the center toward both ends, with merely the diameters decreasing by a fixed measure toward the cylindrical ends to produce the given curve negotiating capability. The joint formed by such a hinge bolt between two chain link members, for example the plates of a plate conveyor, has not only a pivoting capability about the bolt axis, but also a pivotal mobility about all axes perpendicular to the bolt axis. Two adjacent plate members can be pivoted with respect to each other not only in their common plane perpendicular to the bolt axis, as defined by the guide path, but they can additionally be pivoted with respect to each other perpendicularly to the guide plane and perpendicularly to the bolt axis. If such a plate conveyor is guided through a curve in one plane, it cannot be avoided that, under the influence of the pulling forces acting on it in the curve region, the outer edge of the conveyor is pivoted upwardly with respect to its inner edge and thus the outer edge of the article being conveyed through the curve comes to lie higher than its inner edge. Such an inclined conveyor surface, however, is disadvantageous for a number of applications, for example in filling systems employing lightweight and smooth-surfaced containers, since in the curve region the containers may slide off the inside edge of the conveyor. This drawback occurs not only in the above-described plate conveyors, but also in plate link chains designed to be able to negotiate curves.

SUMMARY OF THE INVENTION

It is the object of the invention to provide a curve-negotiating chain conveyor of the above-mentioned type which is designed in such a way that, in addition to being pivotal about the bolt axis, it is possible to pivot adjacent chain link members essentially only about a single axis extending perpendicularly to the bolt axis.

The above and other objects are accomplished according to the invention wherein a plate chain conveyor assembly is provided including a plurality of plate members each having first and second opposite ends, a single hinge eye being provided at the first end of each plate member and two juxtaposed hinge eyes being provided at the second end of each plate member. The plate members are disposed adjacent one another such that the single hinge eye of each plate interengages with the two juxtaposed hinge eyes of an adjacent plate member to form a passage therethrough. A hinge bolt is disposed in each passage formed by the interengaged hinge eyes. Each hinge bolt has cylindrical ends connected to a center section having a center portion. The center section has a cross section which changes from a substantially circularly shaped center portion to a substantially lens-shaped cross section towards each of the cylindrical ends. The hinge bolts are disposed in each of the passages with the lens-shaped cross section having its larger cross sectional dimension oriented perpendicularly to the plane of the plate member having the two juxtaposed hinge eyes through which the bolt passes. Such a configuration of the hinge bolt has the advantage that pivoting of individual chain link members with respect to one another in the sense of twisting them is practically impossible, although pivoting about an axis perpendicular to the plane of the chain link member and pivoting about the bolt axis itself is possible. In this way, when such a chain conveyor is guided through a curve, the outer edge of the conveyor is prevented from raising up under the influence of the pulling forces and the conveying surface therefore does not become inclined toward the inner radius.

One feature of the invention provides that the lensshaped cross-sectional outline is formed by two intersecting circular arcs. It is here a particular advantage if the curvature of the arc sections is constant over the entire length of the center portion. The curvature advisably corresponds to the curvature of the inner face of the hinge eye so that this provides optimum contact between the inner face of the hinge eye and the hinge bolt during each deflection of adjacent chain link members within the permissible pivoting range. With such a dimensioning of the center section in particular, there results, with increasing curvature of the curve, a stiffening of the conveyor which prevents its outer edge from lifting off.

One embodiment of the invention provides that at least one frontal face of the bolt is provided with a slit. During assembly of the individual chain link members, which is done by pressing the hinge bolt into the hinge eyes, this slit serves as a centering means for the tool so that it is assured that the larger cross-sectional dimension is always oriented perpendicularly to the plane of the chain link member.

For a plate conveyor in which the hinge eyes are shaped to the conveyor plates in a rolling process, a suitable embodiment of the invention provides that one of the cylindrical ends of the hinge bolt is provided with a centering tongue on one side. This centering tongue can serve to center the tool with which the bolt is pressed axially into the hinge eyes and can also provide a protection against twisting of the bolt in the hinge eye. In this connection, the fact is utilized to advantage that the rolling process causes the free end, which is rolled against the plate surface, to extend at approximately a right angle to the plane of the plate so that the hinge eye does not have an exactly cylindrical cross section. The bolt is now pressed into the hinge eye in such a manner that the centering tongue comes to rest in this angular range of the hinge eye.

BRIEF DESCRIPTION OF THE DRAWINGS

The invention will now be explained in greater detail with the aid of schematic drawings of one embodiment. It is shown in:

FIG. 1, a plan view of two connected chain link members of a plate conveyor;

FIG. 2, a side view of the arrangement according to FIG. 1;

FIG. 3, a plan view to a larger scale of a hinge bolt;

FIG. 4, a sectional view of the hinge bolt along the line IV—IV in FIG. 3;

FIG. 5, a sectional view through the hinge bolt along the line V—V of FIG. 3;

FIG. 6, a front view of the bolt of FIG. 3;

FIG. 7, a front view, to a larger scale, of a bolt with centering tongue, inserted into a hinge eye.

DESCRIPTION OF THE PREFERRED EMBODIMENT

FIG. 1 is a plan view and FIG. 2 a side view of two chain link members of a curve-negotiating plate conveyor. Each chain link member comprises a metal plate 1, which is provided on one end with a hinge eye 2 and at the opposite end with two juxtaposed hinge eyes 3. The plates are cut, for example, of metal and the hinge eyes are rolled in in a shaping process. The individual plates are joined together to form a belt, with the individual plates being connected together by hinge bolts 4. The hinge bolt 4, whose shape will be explained in greater detail below, has such dimensions that its two outer ends are held in a press fit in the two juxtaposed hinge eyes 3, while its center section has such a diameter that the hinge eye 2 can be freely pivoted about the bolt axis. Moreover, the center section of the hinge bolt 4 is shaped in a certain barrel-shaped manner so that, in addition to its being able to be pivoted about the bolt axis, it is also possible to pivot the plates 1 with respect to one another, within a given range, in the direction of the arrow 5, i.e. about an axis perpendicular to the plane of the plate.

While the prior art bolts, whose center sections had a barrel shape, were produced as turned members, i.e. were rotationally symmetrical to the bolt axis, the bolt design according to the invention is based on a different principle. FIG. 3 shows such a bolt in a "top view", i.e. in an orientation which corresponds to its installed position with respect to the plate members in the view of FIG. 1.

The two outer ends 6,7 of the hinge bolt 4, which is shown to a larger scale, are cylindrical in shape. Its center section, i.e. the region between the two cylindrical ends 6 and 7, has a barrel-shaped contour, so that when adjacent plate members are pivoted against one another, the cylindrical inner face of the hinge eye 2 can roll off on the crowned bolt surface in the direction of the arrow 5.

The cross section of the center portion 8 is now given such a shape that the center of the bolt (section line IV—IV) has a circular cross section, as shown in FIG. 4. The diameter of the bolt at this point is somewhat smaller than the diameter of the two cylindrical ends so that the hinge eye 2 and the two hinge eyes 3 may have the same inner diameter, thus simplifying manufacture of the metal plates. From the center toward the two sides, however, the cross section of the center section changes from a circular shape to a lens shape as is shown for the sectional view V—V in FIG. 5. This cross-sectional shape is defined by two oppositely directed circular arcs, with the particularity thereof being that the associated arc radius is constant over the entire length of the center section so that the curvature of the thus formed bolt surface practically corresponds to the curvature of the associated inner face of the hinge eye 2. The sectional view of FIG. 5 shows that with this design different diameters result in the end region of the center section. In this way, it is assured that the pivotal mobility in the horizontal plane (arrow 5) is given within the intended range, while on the other hand, the pivotal mobility in the sense of twisting of adjacent plates with respect to one another is limited to a minimum.

At the frontal face of the cylindrical section 7, the bolt is advisably provided with a slit 9 which serves as a centering and installation aid when the bolt is pressed into the hinge eyes in the axial direction during assembly of the chain link members. The diameter of the cylindrical sections 6 and 7 is here dimensioned in such a way that the bolt is held in the hinge eyes in a press fit.

FIG. 7 is a front view of a special design wherein the end 7' of the hinge bolt is provided with a centering tongue 10 at one side, the tongue being dimensioned in such a way that, when the bolt is pressed into the associated hinge eye, the tongue comes to rest against the approximately right-angle edge of the rolled-in hinge eye and here serves as a safety against twisting. To illustrate the positioning of the bolt with respect to the plate plane, the cross-sectional outline 11 of the center section 8 of the bolt is indicated accordingly in the end region thereof.

The invention is not limited to the illustrated and described embodiment but can be used in the same manner also for arcuately joined plate link chains if in certain cases of use twisting of the chain is to be made impossible. The illustrated and described shape of the hinge bolt can also be used for plate conveyors made of other materials or according to different manufacturing processes. It is not limited to plates made of cut sections.

I claim:

1. A plate chain conveyor assembly comprising:
   a plurality of plate members each having first and second opposite ends, said first end being provided with a single hinge eye and said second end being provided with two spaced hinge eyes, said plate members being disposed adjacent one another such that the single hinge eye of each said plate member interengages with the two spaced hinge eyes of an adjacent plate member to form a common passage;
   a plurality of hinge bolts each having cylindrical ends and an approximately barrel shaped center section, said center section changing in shape from a substantially circularly shaped center portion to a substantially lens-shaped cross section towards each of said cylindrical ends, one of said hinge bolts being disposed in each said passage with the lens-shaped cross section having its larger cross sectional dimension oriented perpendicularly to the plane of the plate member having the two spaced hinge eyes through which said bolt passes.

2. A plate chain conveyor assembly according to claim 1 wherein said lens-shaped cross section is formed by two intersecting circular arcs.

3. A plate chain conveyor assembly according to claim 2 wherein the curvature of said arcs is constant over the entire length of said center section.

4. A plate chain conveyor assembly according to claim 1, 2 or 3 wherein at least one said cylindrical end of each said hinge bolt has a frontal face with a slit therein.

5. A plate chain conveyor assembly according to claim 4 wherein one said cylindrical end of each said hinge bolt is provided with a lateral centering tongue.

6. A plate chain conveyor assembly according to claim 1, 2 or 3 wherein one said cylindrical end of each said hinge bolt is provided with a lateral centering tongue.

* * * * *